Jan. 6, 1931.　　　E. POMPLUM ET AL　　　1,787,761

PATTERN CAM FOR ENGRAVING MACHINES

Filed June 24, 1925

INVENTORS.
Emil Pomplum,
Walter Jennerjahn
BY
Robert O. Harvey
ATTORNEY.

Patented Jan. 6, 1931

1,787,761

UNITED STATES PATENT OFFICE

EMIL POMPLUM AND WALTER JENNERJAHN, OF CUDAHY, WISCONSIN, ASSIGNORS TO THE FISK RUBBER COMPANY, OF CHICOPEE FALLS, MASSACHUSETTS, A CORPORATION OF MASSACHUSETTS

PATTERN CAM FOR ENGRAVING MACHINES

Application filed June 24, 1925. Serial No. 39,314.

Our invention relates to engraving machines and more particularly to the means controlling the vertical position of the engraving tool when operating on curved surfaces, such as tire molds.

In the past it has been customary to provide a stationary surface over which the upper end of the engraving tool or its holder slides as it is guided in its movement by the pattern through the usual pantograph arrangement, the cam surface in section conforming to the surface curvature of the article being engraved and being of sufficient length to accommodate the largest pattern used.

In engraving tire molds the depth tolerances are exceedingly small and consequently the cam must be made of exceedingly hard material and be very accurately ground over its entire surface. These cams have therefore been costly to manufacture and accidental injury at any point over its extended surface, which must be completely exposed, renders the cam useless.

It is among the objects of our invention to provide a cam arrangement which shall be cheaper to manufacture, less susceptible to damage and therefore more reliable. Other and further objects will appear from the specification and claims.

In the accompanying drawing which illustrates one embodiment of our invention

Figure 1:
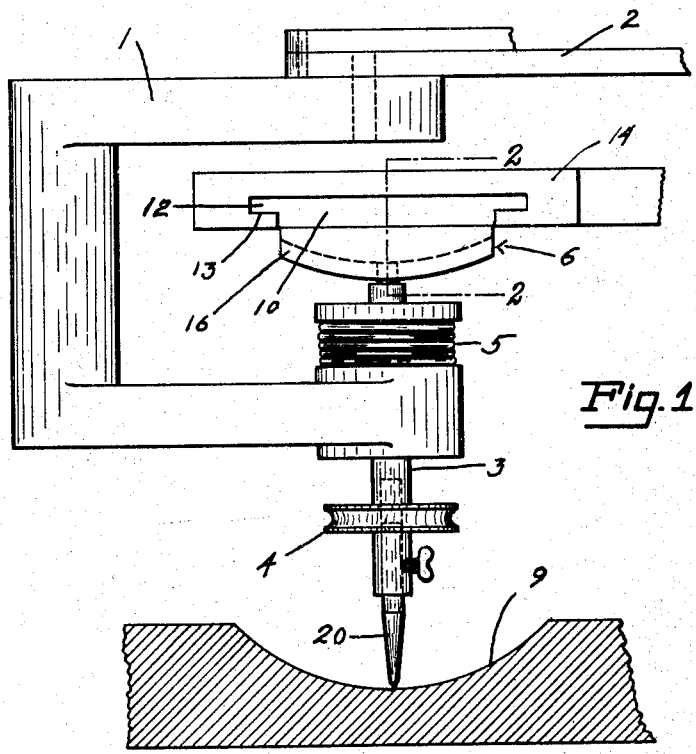
Figure 2:
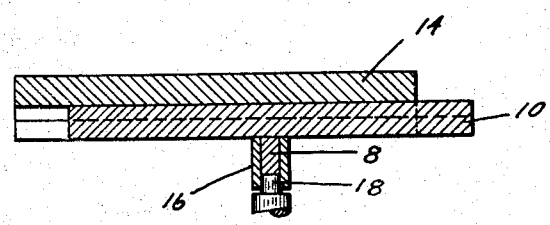

Figure 1 is a diagrammatic elevation of the tool holding portion of a conventional mold engraver, and Figure 2 is a section on line 2—2 of Figure 1.

Referring to the drawings 1 designates the movable tool support, the linkage 2 controlling its movement from a suitable pattern in the usual manner. The tool holder 3 is rotatably mounted in support 1 and is provided with a pulley 4 to receive a driving belt. The tool holder is urged upwardly against the cam, generally indicated at 6, by a spring 5. The structure so far described may be of any conventional form and its specific structure constitutes no part of our invention which resides entirely in the cam structure now to be described. The cam 6 comprises a relatively narrow curved member 8 formed of hard material and accurately ground to the transverse curvature of the mold cavity 9 which is to be engraved. The short extent of the cam surface renders the grinding a comparatively easy matter. The member 8 is secured to a plate 10 provided at its edges with tongues 12 sliding in grooves 13 formed in the stationary member 14. Side plates 16 are secured to plate 10 on either side of the cam member 8 forming with the latter a cam track in which pin 18 formed on the upper end a tool holder 3 is slidable. The plate 10 being freely slidable in member 14 it will be evident that the tool holder with its engraving tool 20 may be swung freely in any direction, the cam member 8 maintaining the tool at the proper elevation at any position of plate 10.

Having described one embodiment of our invention, we claim:

1. A cam for automatically controlling the vertical position of the engraving tool of a pantograph type of pattern controlled engraving machine with respect to a curved surface to be engraved, which comprises a profile cam having a path confined to a plane and conforming to the cross-sectional curvature of the article to be engraved, and a support for the cam freely reciprocable in a direction substantially at right angles to the plane of the cam path.

2. A cam for automatically controlling the vertical position of the engraving tool of a pantograph type of pattern controlled engraving machine with respect to a curved surface to be engraved, which comprises a cam track confined to a plane vertical to the surface to be engraved and conforming to the curvature of said surface, a supporting plate for the cam and a relatively stationary guide for the plate formed to permit free reciprocation of the plate in a path substantially at right angles to the plane of the path of the cam.

In testimony whereof we have signed our names to the above specification.

EMIL POMPLUM.
WALTER JENNERJAHN.